June 16, 1936.   C. W. VOGT   2,044,032
APPARATUS FOR REFRIGERATING ARTICLES IN TRANSIT
Filed June 19, 1934   4 Sheets-Sheet 1
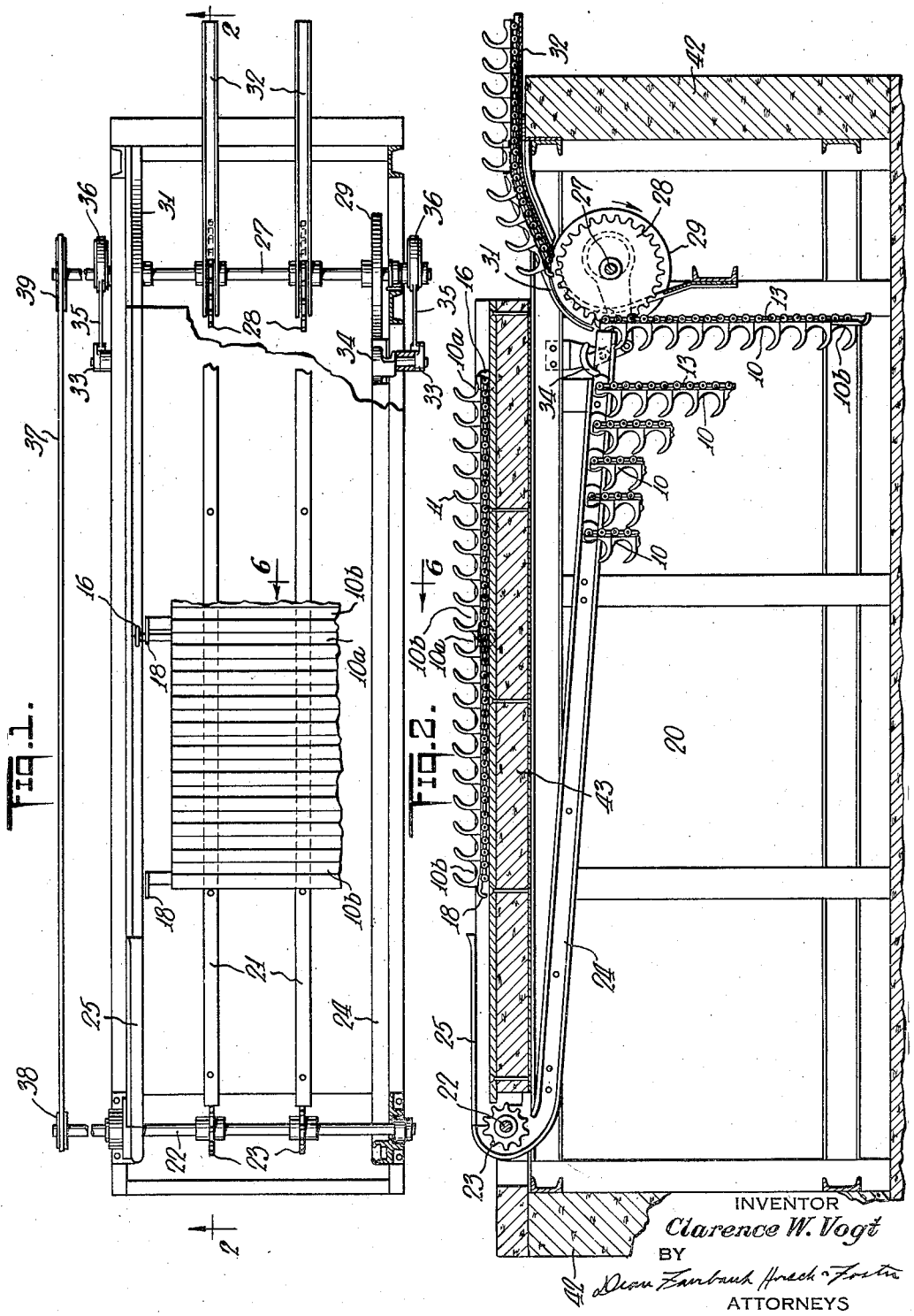

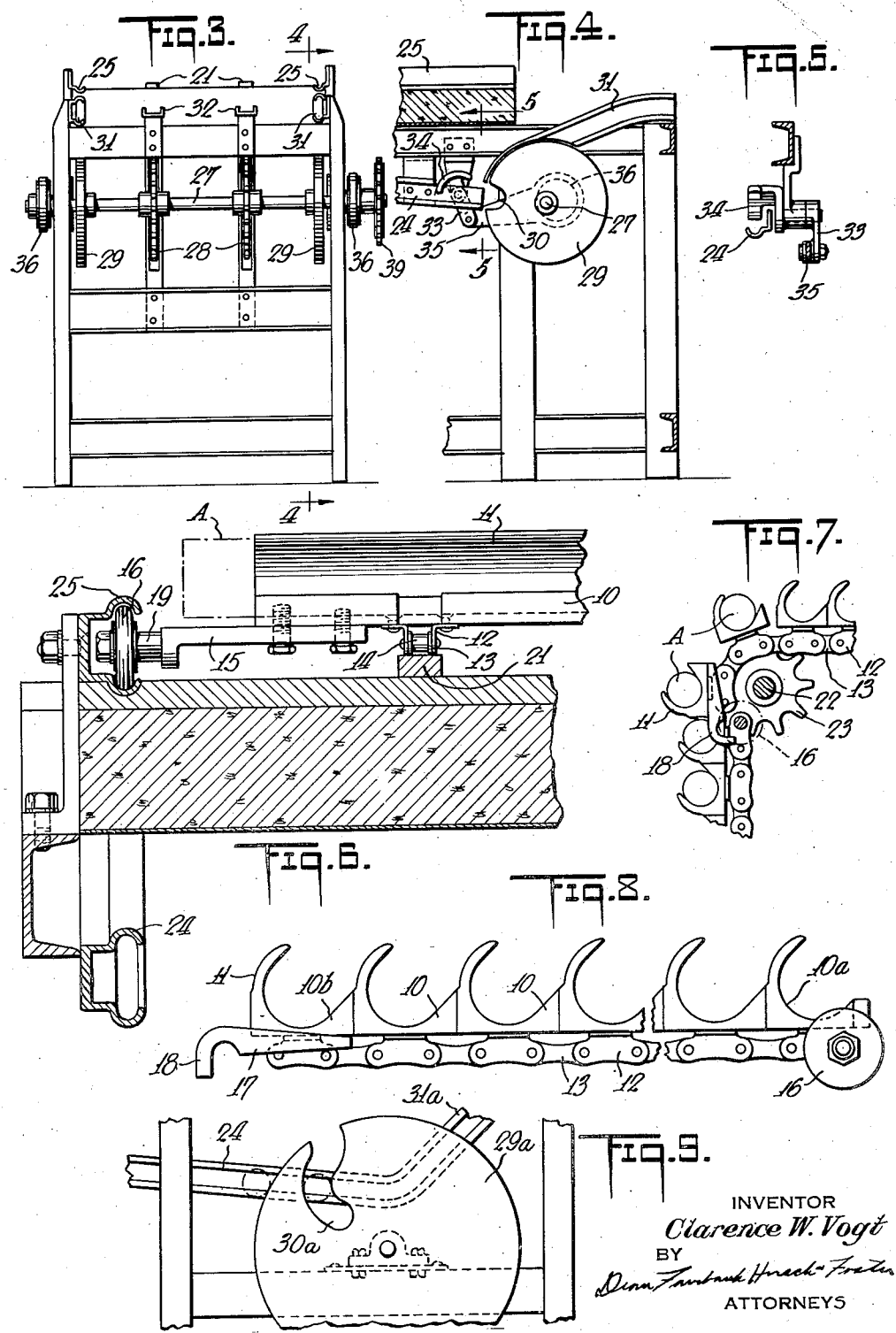

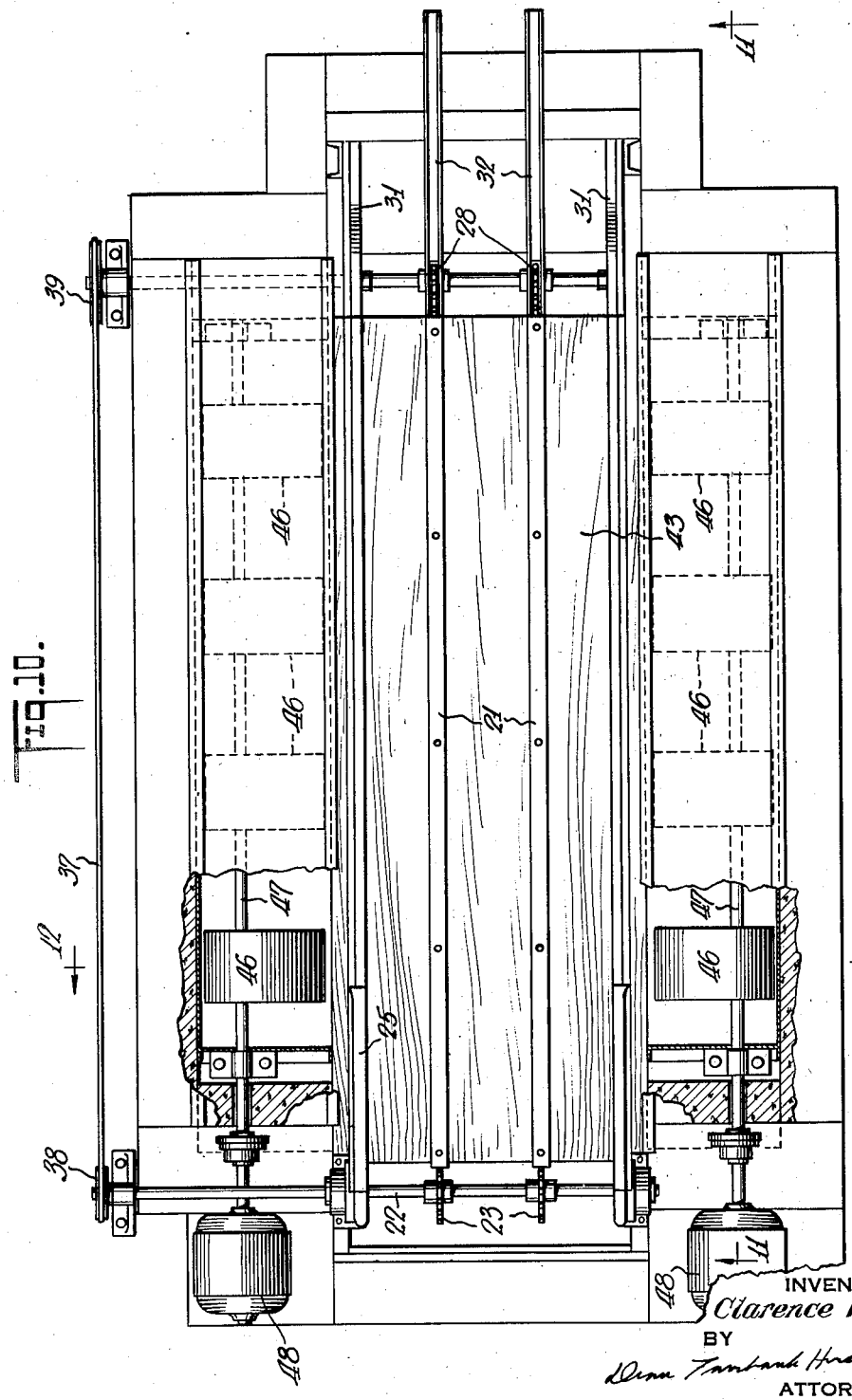

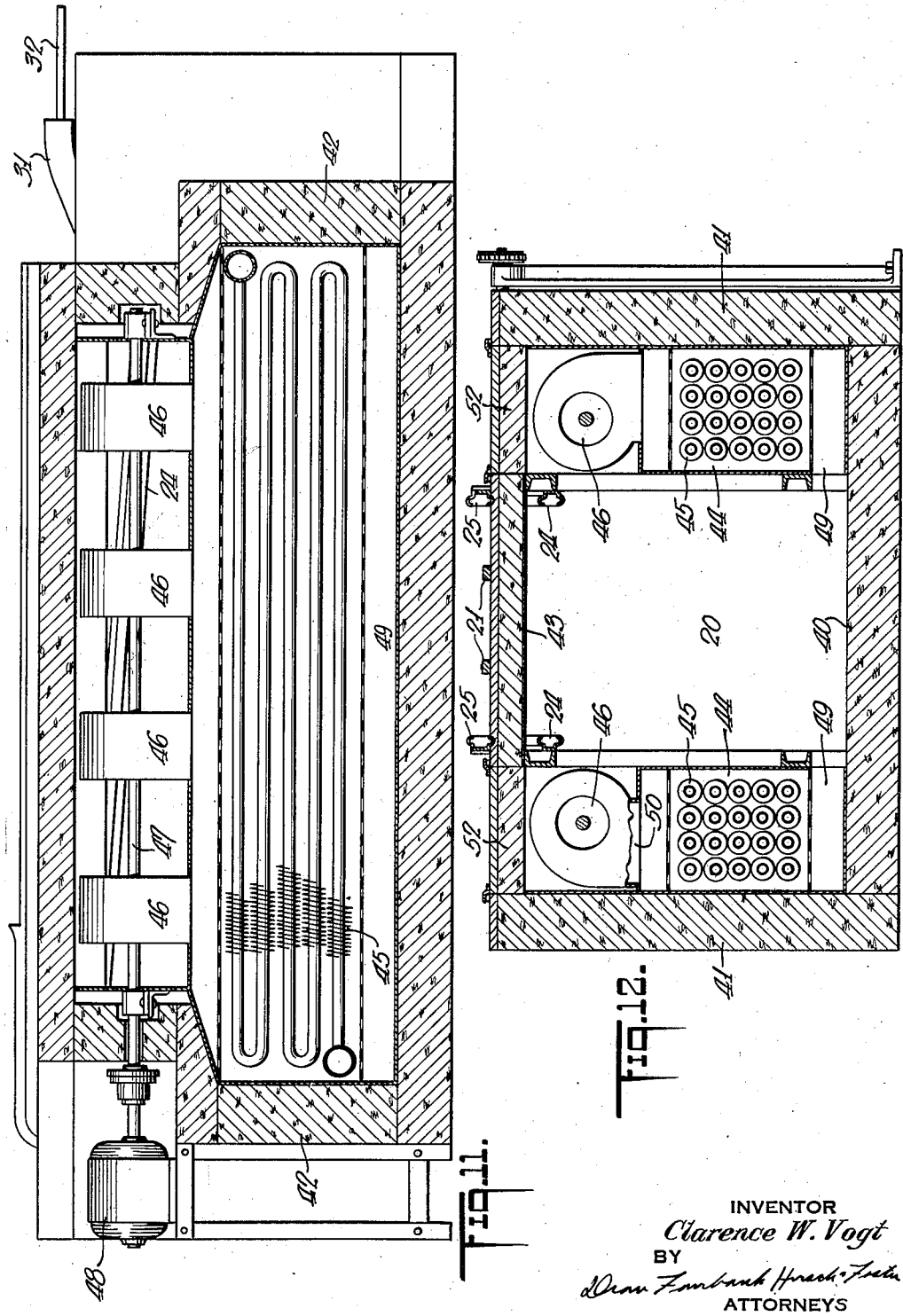

Patented June 16, 1936

2,044,032

UNITED STATES PATENT OFFICE 2,044,032

APPARATUS FOR REFRIGERATING ARTICLES IN TRANSIT

Clarence W. Vogt, Louisville, Ky., assignor to Vogt Processes, Incorporated, Louisville, Ky., a corporation of Delaware Application June 19, 1934, Serial No. 731,302

27 Claims. (Cl. 62—114)

This invention relates to apparatus for subjecting articles to the action of a fluid refrigerating medium under conditions which require such treatment for more than a brief interval and where it is desirable to deliver the articles either intermittently or continuously to the chamber, convey them through the chamber and continuously or intermittently remove them therefrom.
The invention relates particularly to the conveyer or carrier employed, and the main object is to provide a construction whereby the articles to be refrigerated may be quickly delivered into and out of the chamber, but may be conveyed through the chamber at a very much slower rate to allow adequate time for freezing.

A further object is to provide for the processing of a relatively large number of the articles at the same time in a comparatively small chamber, but under conditions which permit of the proper supporting and carrying of the articles in spaced relationship so that they may be exposed to the maximum extent to the chilling medium.
The apparatus may be employed where the articles are to be subjected to the action of either a liquid or a gaseous medium and preferably where the processing involves the abstraction of latent heat from the articles being processed.

The specific embodiment illustrated in the drawings and hereinafter described has been designed primarily for the hardening of partially frozen bars of ice cream which may have been produced by an apparatus of the general type shown in my prior Patents 2,006,375 and 2,006,376, issued July 2, 1935, and which bars after hardening are to be cut up into shorter sections or individual service portions of the general type shown in my Patent 1,906,183, issued April 25, 1933.

As one of the main features of the present invention I provide a plurality of article carriers, each adapted to support a series of the articles in spaced relationship in a single plane. These carriers are delivered endwise in succession through a narrow aperture into the chamber where they are supported in parallel planes in close spaced relationship during their advance through the chamber.

As a further feature of the invention the article carriers are flexible or formed of jointed sections so that they may be bent or curved during their entrance and/or exit from the chamber.
As a further feature the article carriers while in the chamber are suspended from their upper ends so as to hang in parallel vertical planes and are fed or advanced through the processing chamber by gravity along an inclined support or guide whereby the only mechanically actuated mechanism required is that for feeding the carriers into or out of the chamber.

The processing medium, such for instance as very cold air, may be kept in the proper operating condition, for instance at the desired low temperature, by means such as refrigerating coils in the chamber, and it may be kept in circulation in the chamber by any suitable means such as a fan or blower, or it may be refrigerated or otherwise treated outside of the chamber and caused to circulate into, through and out of the chamber.

In the accompanying drawings there is illustrated merely one embodiment of the invention, the outer casing and insulation being omitted in certain of the views, and in these drawings:

Fig. 1 is a top plan view of merely the conveyer portions of the apparatus, certain of the parts being broken away, Fig. 2 is a vertical longitudinal section on the line 2—2 of Fig. 1, Fig. 3 is an end view of a portion of the ejecting mechanism, Fig. 4 is a section on the line 4—4 of Fig. 3, Fig. 5 is a sectional detail on the line 5—5 of Fig. 4, Fig. 6 is a section on the line 6—6 of Fig. 1, but on a larger scale, Fig. 7 is a detail of a portion of the means for feeding the carriers into the chamber,

Fig. 8 is an end view of one of the article carriers,

Fig. 9 is a detail showing an alternative construction to that shown in Fig. 4,

Fig. 10 is a view similar to Fig. 1, but showing the blowers for cold air circulation, and Figs. 11 and 12 are sections on the lines 11—11 and 12—12 respectively of Fig. 10.

The article carrier as shown in Figs. 6, 7 and 8 includes a plurality of bars 10 each having an upwardly extending flange or side wall 11 so formed as to provide a socket or seat for a bar A of the material to be treated. This may be a bar of ice cream frozen sufficiently to be form retaining and having a suitable peripheral wrapper. The bars may be of a length dependent upon the height of the package into which the portions of ice cream or other comestible are to be packed for shipment after the hardening of the bar and the cutting of it transversely into sections. Obviously the bar may be of greater or lesser length, but ordinarily the carrier is so designed that it and its load of bars A may be readily lifted by a workman to dump the product from the carrier after the processing.

The opening between the walls 11 of adjacent bars 10 of the carrier is such as to permit the easy dropping of the ice cream bars onto the carrier when the latter is in horizontal position as shown in Fig. 1, and the walls 11 are curved or flanged so that the articles will not roll off when the carriers are supported in vertical position as shown in the lower portions of Figs. 2 and 7.

The bars 10 are connected together so as to permit relative movement to bend or curve the carrier. As illustrated each bar adjacent to its opposite ends is connected to a pair of plates 12 constituting a link of a chain and the plates or links 12 are connected by intermediate links 13 to pivot pins carrying rollers 14.

The bar 10a at one end of the series constituting the carrier is provided at opposite ends with outwardly extending brackets 15 on which are journaled rollers 16 which are very much larger than the rollers 14 of the chains. The bar 10b at the opposite end of the series forming the carrier is provided with a pair of brackets 17 terminating in hooks 18 which may engage a portion 19 of the brackets 15 to hold the article carriers together while they are moving in the same plane, for instance to the feeding mechanism (not shown) where they receive the articles to be treated and before entering the processing chamber.

In the apparatus illustrated there is provided a processing chamber 20 within which the article carriers are supported during the processing of the article, and means for delivering the article carriers to and from the chamber. As illustrated the chamber supports a pair of horizontal tracks 21 on which the article carriers may be placed and along which they may move toward the entrance end of the chamber. Adjacent to the entrance end of the chamber there is provided a transverse shaft 22 having a pair of sprocket wheels 23, the teeth of which may engage the rollers 14 of the chains. Within the chamber there is provided a pair of tracks 24 which are inclined downwardly at a slight angle from the entrance end toward the delivery end, and at the entrance end these tracks are curved concentric with the sprocket wheels 23 and have extensions 25 along a short portion of the top of the chamber.

The article carriers may be placed on the tracks 21 intermediate of the ends of the latter, and in placing them in position the hooks 18 are engaged with the bracket portions 19 of the next article carrier in advance thereof. The article carriers are then moved along the tracks 21 (toward the left as shown in Figs. 1 and 2) either by hand or suitable advancing mechanism, and the articles are placed by hand or fed by suitable feeding mechanism onto the separate bars 10b, 10 and 10a either while the article carrier is advancing or while it is at rest. As the advancing end of the article carrier passes over the sprockets 23 it will move downward vertically from said sprockets until the rear end having the rollers 16 passes around the sprocket wheels. These rollers are supported by the tracks 21 as they approach the sprocket wheels, and guided by the extensions 25 of tracks 24 as they pass over the sprocket wheels. The chains are freed from the sprocket wheels below the latter and the carrier moves laterally along the tracks 24, being supported by the rollers 16 of the rear or uppermost bar, the remaining bars being suspended from the uppermost one by the chain connection. As the rollers of each article carrier reach approximately the position shown in Fig. 7 and start or are about to start down the incline 24, the carrier is automatically disengaged from the following carrier so that the advancing end of each carrier becomes freed from the rear end of the carrier in advance, and each carrier is lowered in a vertical plane until it is entirely within the chamber and can then move laterally (toward the right in Fig. 2) in a suspended position. The disengagement may be effected by the lateral movement of the rollers away from the hook 18 or by a trip acting to disengage the hook, or in any other suitable manner.

As the article carriers move along the inclined tracks 24 by gravity each one is closely juxtaposed to the one in advance thereof so that the entire chamber may be filled by closely juxtaposed suspended carriers each one supporting a plurality of articles to be treated. The spacing of the articles may be due solely to the bars of one carrier abutting against the edges of the walls 11 on the next carrier. In this way a very large number of the articles may be supported in a comparatively small chamber, and the movement of the carriers along the track 14 may be a very slow one and dependent upon the rate at which the carriers are removed from the chamber at the delivery end.

At the delivery end there is provided means for engaging each carrier in succession, lifting it up out of the chamber and forcing it along a suitable support and in a substantially horizontal plane. In the construction illustrated in Figs. 1 to 6 inclusive, this includes a transverse shaft 27 having a pair of sprocket wheels 28 in the same plane with the sprocket wheels 23 and adapted to engage the chains of the carriers. The shaft also has a pair of discs 29 disposed in the same plane with the tracks 24 and having their peripheries acting to normally close the ends of the tracks 24 or otherwise act as a stop and limit the movement of the carriers down the track. The diameters of the discs 29 are such in respect to the diameters of the sprocket wheels that when the rollers 16 are in engagement with the cylindrical portions of the peripheries of the discs, the chains will be prevented from engaging with the sprocket wheels 28. Each disc has a notch or recess 30 in its periphery and into which the corresponding roller 16 may enter when the notch is opposite the end of the track 24 as shown in Fig. 4.

The shaft 27 is rotatable in a clockwise direction so that as the rollers enter the notches and the chains simultaneously engage the sprocket wheels 28 the carrier will be lifted and delivered from the chamber.

Adjacent to the discs are tracks 31 extending substantially tangentially from the upper sides of the discs as shown in Fig. 4 and in the planes of the sprocket wheels, and substantially tangential thereto are tracks 32 for supporting the chains. Thus as the shaft 27 is rotated the carrier is lifted and guided by the tracks 31 and 32 and is delivered above the chamber and in a substantially horizontal plane.

The peripheries of the discs need not act as a stop in the path of the tracks 24, but there may be and preferably is employed a separate stop which is moved into and out of the path of the carriers to permit them to pass one at a time to the discs 29 and once during each revolution of the discs. As shown there is provided a pivoted member 33 adjacent to the lower end of each track 24 and having a stop 34 movable into and out of the path of the rollers 16. This member 33 is connected by a link 35 to an eccentric disc or crank 36 on the shaft 27. The eccentric is so positioned in respect to the notch or recess 30 that as the shaft rotates the stop raises to permit one carrier to move past it and then lowers to stop the next carrier, and the carrier which has passed the stop will engage the peripheries of the discs until the notch 30 arrives opposite the end of the track and then that carrier is lifted out. Thus the next to the last carrier is held spaced from the last one so that it will not in any way interfere with the vertical and bending movement of the carrier being delivered.

In Fig. 9 a modified construction is illustrated in which the eccentric disc, link and pivoted stop member are omitted. In this construction the disc 29a has a recess 30a of such form that when it is opposite the end of the stack only a single roller may enter, and as the disc rotates in a clockwise direction this roller is advanced along the track while the periphery of the disc holds back the next succeeding carrier. The notch or slot 30a is so formed that movement of the rollers along the track is properly timed in respect to the movement of the carrier resulting from the engagement of the chains of the latter with the sprocket wheels.

Although in Figs. 1 to 6 inclusive the discs may directly engage the rollers of the conveyers, the disc 29a shown in Fig. 9 may be axially offset so as to engage the portions 19 of the brackets 15 of the terminal carrier unit and thus the upwardly inclined track 31a may be formed integral with and as an extension of the downwardly inclined track 24.

The sprocket wheels 28 are of such a diameter that their peripheries have at least as great and preferably a slightly greater number of teeth than the rollers on the carrier. In other words, the circumference of the sprocket wheels is slightly greater than the length of the carrier. Thus each carrier is moved up onto the tracks 32 before the next carrier is permitted to engage with the lifting mechanism.

The articles may be removed by hand from the carrier while it is on the tracks 32 which may constitute an unloading platform or the entire carrier may be picked up by hand and turned over so as to dump out the hardened rods or otherwise treated product. The unloading platform is substantially in alignment with the loading platform formed by the tracks 21 so that as each carrier is unloaded it may be replaced on the loading platform to receive another series of articles and be delivered into the treating chamber. The carriers may be moved along the loading platform 21 by hand if they are hand loaded, but for continuous operation each carrier, when it is placed on the loading platform, has its hooks 18 engaged with the next carrier in advance thereof and the sprocket wheels 23 act to continuously advance the carriers along the loading platform at a uniform rate, deliver them into the chamber and automatically disengage each carrier from the preceding one when it reaches the depending position in the chamber. In Fig. 7 the depending carrier is shown in the position which it occupies as it first starts its movement along the inclined track 24 and is shown as partially disengaged from the entering carrier.

The continuous feeding of the carriers along the loading platform will act to bring each carrier unit beneath a suitable delivery device (not shown) so that the carriers are progressively loaded in succession as they move along.

The shafts 22 and 27 are preferably interconnected and driven in timed relationship so that carriers are taken out of the chamber at the same rate as that at which they are admitted.

By making the sprocket wheels 28 of twice the number of teeth of the sprocket wheels 23 and by connecting the shafts by a chain 37 and sprocket wheels 38 and 39, the latter being of twice the number of teeth of the former, this simultaneous delivery and feeding in proper timed relationship is secured.

The mechanism above described may be supported on any suitable form of skeleton framework or upon the walls of the chamber. If a skeleton framework be employed it may be incorporated as a part of the frame of the chamber or may be bodily set within the chamber. Where the articles are to be heat treated, the walls of the chamber should be covered with insulation. In Figs. 10, 11 and 12 I have shown particularly the means which may be employed for the intensive chilling of ice cream bars.

The chamber is provided with a bottom wall 40, side walls 41 and end walls 42 of insulating material, and the top wall 43 between the interior of the chamber and the tracks may likewise be of insulation. The chamber is shown as somewhat wider than the carrier units, that is, it is wider than the ice cream bars are long.

Within the side extensions are two compartments 44 within which are mounted refrigerating coils 45 which are preferably provided with heat absorbing fins. Above each compartment 44 there is provided a plurality of blowers 46, all of the blowers on each side being mounted on a single shaft 47 which may be operated by a motor 48 outside of the chamber. The compartments 44 are closed along the sides toward the article receiving chamber, but are open at the bottom to provide cold air outlets 49. Each compartment 44 is closed at the top except for the air intakes 50 through which the blowers deliver the air down over the coils. Air may be taken in from the upper part of the chamber 20 between the separate blowers.

The top wall of the apparatus may include covers 52 of insulating material over the two rows of blowers so that access may be readily gained to these blowers, if desired. Various other means may be employed for maintaining the chamber 20 at the desired temperature and for causing a circulation of air. In the construction illustrated it will be noted that the air is delivered into the chamber 20 from opposite sides adjacent to the bottom and flows upwardly between the adjacent depending article carriers and then laterally out of the chamber at the upper part to the intake of the several blowers.

I have referred to the chains and the carrier bars or units as separate elements, although it will of course be understood that the carrier units themselves may constitute portions of the links of the chains, and the units connected by overlapping lugs and pintles. Although the said mechanism becomes disengaged from each carrier, in the form illustrated, before the entire carrier reaches a horizontal plane it will be evident that each carrier as it is lifted may abut against the next one in advance thereof and continuously push the delivered carriers along an unloading platform to any desired length. Preferably the unloading platform is short, and the operator picks up and removes the carrier as soon as it becomes released from the delivery mechanism.

Various changes may be made in the construction illustrated without departing from the spirit of my invention.

Having thus described my invention, what I claim as new and desire to secure by Letters Patent is:

1. An apparatus for hardening ice cream bars, including a refrigerating chamber, a plurality of flexible carriers each adapted to support a plurality of ice cream bars in parallel spaced relationship, separate loading and unloading platforms to support said carriers in horizontal position, a track within said chamber for supporting said carriers in parallel spaced planes and in closely juxtaposed relationship, and means for delivering said carrier from said loading platform to said track and from said track to said unloading platform.

2. An apparatus for the hardening of partially frozen articles, including a hardening chamber having an inlet and an outlet, a plurality of article carriers each adapted to support a plurality of articles in spaced relationship, means for delivering said carriers in succession through said inlet, means for suspending said articles during movement through said chamber, means for delivering said carriers from said chamber, and means for circulating refrigerated air about said articles while in the chamber.

3. An apparatus for the processing of ice cream bars, including a processing chamber having an inlet and an outlet in the top thereof, a plurality of article carriers each adapted to support a plurality of bars in spaced relationship, means for delivering said carriers in succession through said inlet, means for suspending said carriers during movement through said chamber, means for delivering said carriers from said chamber, and means for maintaining a circulation of a cold gas through the chamber and about the bars.

4. An apparatus for the abstraction of latent heat from articles, including a processing chamber having an inlet and an outlet, a plurality of article carriers each adapted to support a plurality of articles in spaced relationship, means for delivering said carriers in succession through said inlet, an inclined track for suspending said articles during movement through said chamber, means for delivering said carriers from said chamber, and means for causing a rapid circulation of refrigerated gas through said chamber.

5. An apparatus for the hardening of articles, including a processing chamber having an inlet and an outlet, a plurality of article carriers each adapted to support a plurality of articles in spaced relationship, a sprocket wheel for delivering said carriers in succession through said inlet, means for suspending said articles during movement through said chamber, means for delivering said carriers from said chamber, and means for circulating refrigerated air through said chamber.

6. An apparatus for the hardening of ice cream bars, including a hardening chamber having an inlet and an outlet, a plurality of article carriers each adapted to support a plurality of articles in spaced relationship, means for delivering said carriers in succession through said inlet, means for suspending said articles during movement through said chamber, a sprocket wheel for delivering said carriers from said chamber, and means for blowing a blast of cold air through the chamber.

7. An apparatus for the processing of articles, including a processing chamber having an inlet and an outlet, a plurality of flexible article carriers each adapted to support a plurality of articles in spaced relationship, means for delivering said carriers in succession through said inlet, means for suspending said articles during movement through said chamber, means for delivering said carriers from said chamber, and means for rapidly circulating an intensely cold blast of air through said chamber.

8. An apparatus for the processing of articles, including a processing chamber, a plurality of article carriers each adapted to support a plurality of articles in spaced relationship and including a pair of chains with carrier elements secured thereto along the length thereof, a pair of sprocket wheels for engaging said chains to feed said carriers into said chamber, means extending lengthwise of said chamber for supporting said carriers therein in suspended position, means for keeping the air in said chamber constantly in motion, and means for intensely refrigerating said air.

9. An apparatus for the processing of articles, including a processing chamber, a plurality of article carriers each adapted to support a plurality of articles in spaced relationship and including a pair of chains with carrier elements secured thereto along the length thereof, rollers secured to each of said carriers at one end, a track within said chamber for supporting said carriers in suspended parallel positions, means for delivering said carriers from said chamber, means for keeping the air in said chamber constantly in motion, and means for intensely refrigerating said air.

10. An apparatus for processing articles, including a processing chamber, a plurality of flexible article carriers each adapted to support a plurality of articles in spaced relationship, a loading platform above said chamber for holding said carriers in a horizontal plane, a track within said chamber adapted to support said carriers in suspended parallel positions, means for feeding the carriers in succession from a horizontal plane on said loading platform to a vertical plane on said track within said chamber, means for blowing air through said chamber, and means for intensely refrigerating said air.

11. An apparatus for processing articles, including a plurality of article carriers each including a plurality of horizontally connected carrier units, a pair of rollers secured to one terminal unit of each carrier, a hook connected to the other terminal unit of each carrier and adapted to engage another carrier to connect the carriers together in series, a processing chamber, means for feeding said carriers into said chamber and automatically disconnecting each carrier from the preceding one, tracks within said chamber for engaging said rollers and holding said carriers in suspended position, means for blowing air through said chamber, and means for intensely refrigerating said air.

12. An apparatus for processing articles, including a processing chamber, a plurality of flexible article carriers each adapted to support a plurality of articles in spaced relationship, an inclined track within said chamber and adapted to support said carriers in suspended positions in parallel planes, a sprocket wheel for engaging the carriers in succession at the lower end of said track and lifting them vertically out of said chamber, means for blowing air through said chamber, and means for intensely refrigerating said air.

13. An apparatus for processing articles, including a processing chamber, a plurality of flexible article carriers each adapted to support a plurality of articles in spaced relationship, an inclined track within said chamber and adapted to support said carriers in suspended positions in parallel planes, a sprocket wheel for engaging the carriers in succession at the lower end of said track and lifting them vertically out of said chamber, means for preventing advancing movement of said carriers on the track during the lifting movement of the terminal carrier, means for blowing air through said chamber, and means for intensely refrigerating said air.

14. An apparatus for processing articles, including a processing chamber, a pair of substantially horizontal tracks in alignment above said chamber and one constituting a loading platform and the other an unloading platform, a track within said chamber and extending lengthwise thereof, a plurality of flexible article carriers, means for feeding said carriers from said loading platform to one end of said track, means for delivering said carriers from the opposite end of said track to said unloading platform, means for blowing air through said chamber, and means for intensely refrigerating said air.

15. An apparatus for processing articles, including a processing chamber, a pair of substantially horizontal tracks in alignment above said chamber and one constituting a loading platform and the other an unloading platform, a track within said chamber and extending lengthwise thereof, a plurality of flexible article carriers, means for feeding said carriers from said loading platform to one end of said track, means for delivering said carriers from the opposite end of said track to said unloading platform, each of said means including a sprocket wheel and said sprocket wheels being connected for simultaneous operation, means for blowing air through said chamber, and means for intensely refrigerating said air.

16. An apparatus for processing articles, including a processing chamber having an inclined track therein extending lengthwise thereof and in the upper portion thereof, a pair of shafts at opposite ends of said chamber, sprocket wheels on said shafts, means connecting said shafts for simultaneous rotation, a plurality of flexible article carriers each adapted to support a plurality of articles to be treated and in spaced relationship, one of said sprocket wheels operating to feed said carriers in succession to the upper end of said track and the other adapted to feed said carriers in succession out of said chamber from the other end of said track, each of said carriers having means at one end thereof for supporting the carrier in suspended position from said track, means for blowing air through said chamber, and means for intensely refrigerating said air.

17. An apparatus for processing articles, including a carrier formed of a plurality of carrier bars each presenting a channel to receive a bar of ice cream to be hardened, links connecting said carrier bars together in series, a pair of rollers connected to one terminal carrier bar of the series, and a pair of hooks connected to the opposite terminal carrier bar of the series and adapted to engage with an adjacent carrier to detachably connect the carriers together in series.

18. An apparatus for processing articles, including a carrier formed of a plurality of carrier bars each presenting a channel to receive a bar of ice cream to be hardened, links connecting said carrier bars together in series, a pair of rollers connected to one terminal carrier bar of the series, a pair of hooks connected to the opposite terminal carrier bar of the series and adapted to engage with an adjacent carrier to detachably connect the carriers together in series, a loading platform adapted to support said carrier in a horizontal plane, a track adapted to engage with said rollers and support said carrier in a suspended position, and means for transferring said carrier from said loading platform to said tracks.

19. An apparatus for hardening ice cream bars including a refrigerating chamber having refrigerating coils upon opposite sides thereof, a plurality of flexible carriers each adapted to support a plurality of ice cream bars in parallel spaced relationship, tracks for supporting said carriers and permitting movement thereof lengthwise of the chamber between said coils, and means for effecting air circulation over said coils and carriers.

20. An apparatus for hardening bars of ice cream or the like, including a chamber, a plurality of carriers each adapted to support a plurality of said bars in parallel spaced relationship, tracks within said chamber for supporting said carriers in parallel spaced vertical planes, said tracks extending lengthwise of said chamber, and means for delivering cold air to said chamber along the length thereof adjacent to the bottom and withdrawing the air from the upper part of the chamber along the length thereof at the top.

21. An apparatus for refrigerating comestible articles, including a chamber having an inlet and an outlet in the top thereof, a plurality of article carriers, means for delivering said carriers downwardly into said chamber through said inlet, means for holding said article carriers in suspended position with the articles in said carriers arranged one above the other as the carriers pass through the chamber, means for delivering said carriers upwardly out of the chamber from said outlet, and means for circulating cold air through said chamber to refrigerate said articles.

22. An apparatus for abstracting latent heat from comestibles including a refrigerating chamber, a horizontal trackway adjacent to said chamber, an inclined trackway within said chamber, carrier members for the comestibles adapted to progress horizontally on the first-mentioned trackway, means for moving the carriers from said trackway into the chamber and suspending them vertically on the second-mentioned trackway and means for removing the carriers from the chamber.

23. Apparatus for hardening ice cream bars or the like, including a refrigerating chamber, means for maintaining a constant circulation of intensely refrigerated air through said chamber, a plurality of carriers each having a plurality of holders, each holder for supporting a separate ice cream bar to be hardened, and means for suspending said carriers within the chamber and causing them to advance through the chamber.

24. Apparatus for hardening ice cream bars or the like, including a refrigerating chamber, means for maintaining a constant circulation of intensely refrigerated air through said chamber, a plurality of carriers for supporting the ice cream bars to be hardened, and means for sustaining said carriers within the chamber and causing them to advance through the chamber, said carriers in their progress through the chamber supporting the ice cream bars in substantially vertical rows.

25. An apparatus for hardening ice cream bars, including a chamber, a flexible carrier having a series of supports serving to receive and carry separate bars in parallel positions, means for supporting said carrier within said chamber with said bar supports in superposed positions in a vertical plane, a refrigerating conduit, and means for circulating air over the bars on said carrier and over said conduit, said chamber having an opening through which said carrier may be bodily removed from said chamber.

26. An apparatus for hardening ice cream bars, including a chamber, a flexible carrier having a series of supports serving to receive and carry separate bars in parallel positions, means for supporting said carrier within said chamber with said bar supports in superposed positions in a vertical plane, a refrigerating conduit, and means for circulating air over the bars on said carrier and over said conduit.

27. An apparatus for hardening ice cream bars or the like, including a chamber, means in said chamber for supporting said bars in horizontal positions in a plurality of vertical planes, means whereby said bars are progressively advanced from one end of said chamber toward the other, a refrigerating conduit, and means for circulating air over the bars in said vertical planes and over said conduit, said chamber having an opening through which said bar supporting means may be bodily removed from said chamber.

CLARENCE W. VOGT.